UNITED STATES PATENT OFFICE.

JOHN G. BRIGGS, OF VISALIA, CALIFORNIA.

POLISH FOR VARNISHED SURFACES AND THE LIKE.

1,289,103.  Specification of Letters Patent.  Patented Dec. 31, 1918.

No Drawing.  Application filed February 27, 1917.  Serial No. 151,373.

*To all whom it may concern:*

Be it known that I, JOHN G. BRIGGS, a citizen of the United States, residing at Visalia, in the county of Tulare and State of California, have invented a new and useful Polish for Varnished Surfaces and the like, of which the following is a specification.

My composition consists of the following ingredients, combined in the proportions and in the manner stated, viz:

| | |
|---|---|
| Beeswax | 3 ounces. |
| Rosin | 1 ounce. |
| Gum camphor | 1 ounce. |
| Spirits of turpentine | 5 ounces. |
| Benzin | 1 ounce. |

To these ingredients there may be added sufficient dry coloring matter mixed in two ounces of spirits of turpentine to give the polish the color desired for applying to colored surfaces.

The ingredients of my combination are to be thoroughly mixed and ground together and are to be combined in the following manner:

The camphor and turpentine should be united and so remain until the gum camphor has become fully dissolved in the spirits of turpentine; the beeswax and rosin should be melted and be thoroughly mixed by agitation while warm and in a melted condition; while still warm the beeswax and rosin should be united with the mixture composed of gum camphor and spirits of turpentine, to which should also be added the benzin, and the whole of the ingredients then are to be thoroughly mingled by grinding or agitation.

If a colored polish is desired, a sufficient amount of dry color should be added to two ounces of spirits of turpentine and thoroughly mixed therein, and this should be added to the foregoing combination while still warm and thoroughly mixed throughout the entire composition of matter.

In using the foregoing composition of matter the surface to be renewed should first be thoroughly cleansed and dried, and then a thin coating of the above composition should be applied to the surface to be polished or renewed with a cotton cloth or other device or by other means, and a thin coating of the composition should be spread over the entire surface. This should be allowed to stand untouched for a period of about ten or fifteen minutes, and the entire surface should then be rubbed or polished with a cotton cloth, or other form of polishing cloth or device.

The surface which was formerly dull and without luster will thereupon take upon itself a high luster or polish, which is impervious to water, and is dry and will not collect dust, and which will remain thereon for an extended period of time, depending upon the amount of exposure to which the surface is subjected.

I claim:

1. The herein described composition comprising beeswax, rosin, gum camphor, spirits of turpentine, and benzin, substantially as described and for the purpose specified.

2. The herein described composition for polishing varnished surfaces and the like, comprising three ounces of beeswax, one ounce of rosin, one ounce of gum camphor, five ounces of spirits of turpentine, and one ounce of benzin, substantially as described.

3. The herein described composition consisting of beeswax, rosin, gum camphor, spirits of turpentine, benzin, and dry color substantially as herein described and for the purpose specified.

4. The herein described composition for polishing varnished surfaces and the like, consisting of three ounces of beeswax, one ounce of rosin, one ounce of gum camphor, five ounces of spirits of turpentine, one ounce of benzin, and a sufficient amount of coloring matter of the color desired, substantially as described.

JOHN G. BRIGGS.

Witnesses:
W. R. BAILEY,
L. E. McCABE.